US010323176B2

(12) United States Patent
Nguyen et al.

(10) Patent No.: US 10,323,176 B2
(45) Date of Patent: Jun. 18, 2019

(54) METHODS FOR ENHANCING SUSPENSION AND TRANSPORT OF PROPPANT PARTICULATES AND SUBTERRANEAN FORMATION CONDUCTIVITY

(71) Applicant: Halliburton Energy Services, Inc., Houston, TX (US)

(72) Inventors: Philip D. Nguyen, Houston, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/759,197

(22) PCT Filed: Oct. 22, 2015

(86) PCT No.: PCT/US2015/056863
§ 371 (c)(1),
(2) Date: Mar. 9, 2018

(87) PCT Pub. No.: WO2017/069759
PCT Pub. Date: Apr. 27, 2017

(65) Prior Publication Data
US 2018/0251669 A1    Sep. 6, 2018

(51) Int. Cl.
*E21B 43/267* (2006.01)
*C09K 8/68* (2006.01)
(Continued)

(52) U.S. Cl.
CPC ............... *C09K 8/68* (2013.01); *C09K 8/665* (2013.01); *C09K 8/80* (2013.01); *C09K 8/805* (2013.01);
(Continued)

(58) Field of Classification Search
CPC .................. C09K 8/68; E21B 43/267
(Continued)

(56) References Cited

U.S. PATENT DOCUMENTS 6,776,235 B1 * 8/2004 England ............... E21B 43/267
166/271
7,044,220 B2    5/2006 Nguyen et al.
(Continued)

FOREIGN PATENT DOCUMENTS

| WO | WO-2011149618 A1 | 12/2011 |
| WO | WO-2015/041633 A1 | 3/2015 |
| WO | WO-2015/137955 A1 | 9/2015 |

OTHER PUBLICATIONS

International Search Report and Written Opinion from PCT/US2015/056863, dated Jul. 21, 2016, 12 pages.

*Primary Examiner* — William D Hutton, Jr.
*Assistant Examiner* — Ashish K Varma
(74) *Attorney, Agent, or Firm* — McGuireWoods LLP

(57) ABSTRACT

Methods including introducing a first particulate-free treatment fluid (first PFTF) into a subterranean formation above the fracture gradient. Alternatingly introducing a first particulate-laden treatment fluid (first PLTF) and a second particulate-laden treatment fluid (second PLTF) into the subterranean formation, wherein the first PLTF comprises nano-particles and degradable particles and the second PLTF comprises proppant particulates, and wherein the alternating introduction causes the proppant particulates in the second PLTF to agglomerate into proppant aggregates being surrounded by the first PLTF. Placing the proppant aggregates into at least one fracture, removing the hydraulic pressure to close the at least one fracture, and degrading the degradable particulates to form at least one channel between adjacent proppant aggregates.

20 Claims, 1 Drawing Sheet

(51) Int. Cl.
    *C09K 8/66* (2006.01)
    *C09K 8/80* (2006.01)
    *C09K 8/88* (2006.01)
    *C09K 8/90* (2006.01)

(52) U.S. Cl.
    CPC ............... *C09K 8/88* (2013.01); *C09K 8/90* (2013.01); *E21B 43/267* (2013.01); *C09K 2208/10* (2013.01)

(58) Field of Classification Search
    USPC ..................................................... 166/280.2
    See application file for complete search history.

(56) References Cited

U.S. PATENT DOCUMENTS

| | | | |
|---|---|---|---|
| 7,784,542 B2 | 8/2010 | Roddy et al. | |
| 7,806,183 B2 | 10/2010 | Roddy et al. | |
| 7,892,352 B2 | 2/2011 | Roddy et al. | |
| 8,448,706 B2 | 5/2013 | Hughes et al. | |
| 8,586,512 B2 | 11/2013 | Roddy et al. | |
| 8,598,093 B2 | 12/2013 | Roddy et al. | |
| 8,603,952 B2 | 12/2013 | Roddy et al. | |
| 8,657,002 B2 | 2/2014 | Willberg et al. | |
| 8,685,903 B2 | 4/2014 | Ravi et al. | |
| 8,741,818 B2 | 6/2014 | Ravi et al. | |
| 8,757,259 B2 | 6/2014 | Lesko et al. | |
| 8,776,882 B2 | 7/2014 | Shindgikar et al. | |
| 8,973,659 B2 | 3/2015 | Karadkar et al. | |
| 8,997,868 B2 | 4/2015 | Nguyen et al. | |
| 2008/0135242 A1* | 6/2008 | Lesko | C09K 8/665 166/268 |
| 2008/0277116 A1 | 11/2008 | Roddy et al. | |
| 2009/0124522 A1 | 5/2009 | Roddy | |
| 2009/0236097 A1 | 9/2009 | Roddy et al. | |
| 2009/0260544 A1 | 10/2009 | Roddy et al. | |
| 2010/0016183 A1 | 1/2010 | Roddy et al. | |
| 2010/0025039 A1 | 2/2010 | Roddy et al. | |
| 2010/0096135 A1 | 4/2010 | Roddy et al. | |
| 2010/0273912 A1 | 10/2010 | Roddy et al. | |
| 2011/0162845 A1 | 7/2011 | Ravi et al. | |
| 2012/0186494 A1 | 7/2012 | Roddy et al. | |
| 2012/0192768 A1 | 8/2012 | Ravi et al. | |
| 2012/0211227 A1 | 8/2012 | Thaemlitz et al. | |
| 2013/0312962 A1* | 11/2013 | Weaver | C09K 8/805 166/280.1 |
| 2014/0008067 A1 | 1/2014 | Roddy et al. | |
| 2014/0148369 A1 | 5/2014 | Tang et al. | |
| 2014/0221257 A1 | 8/2014 | Roddy et al. | |

* cited by examiner

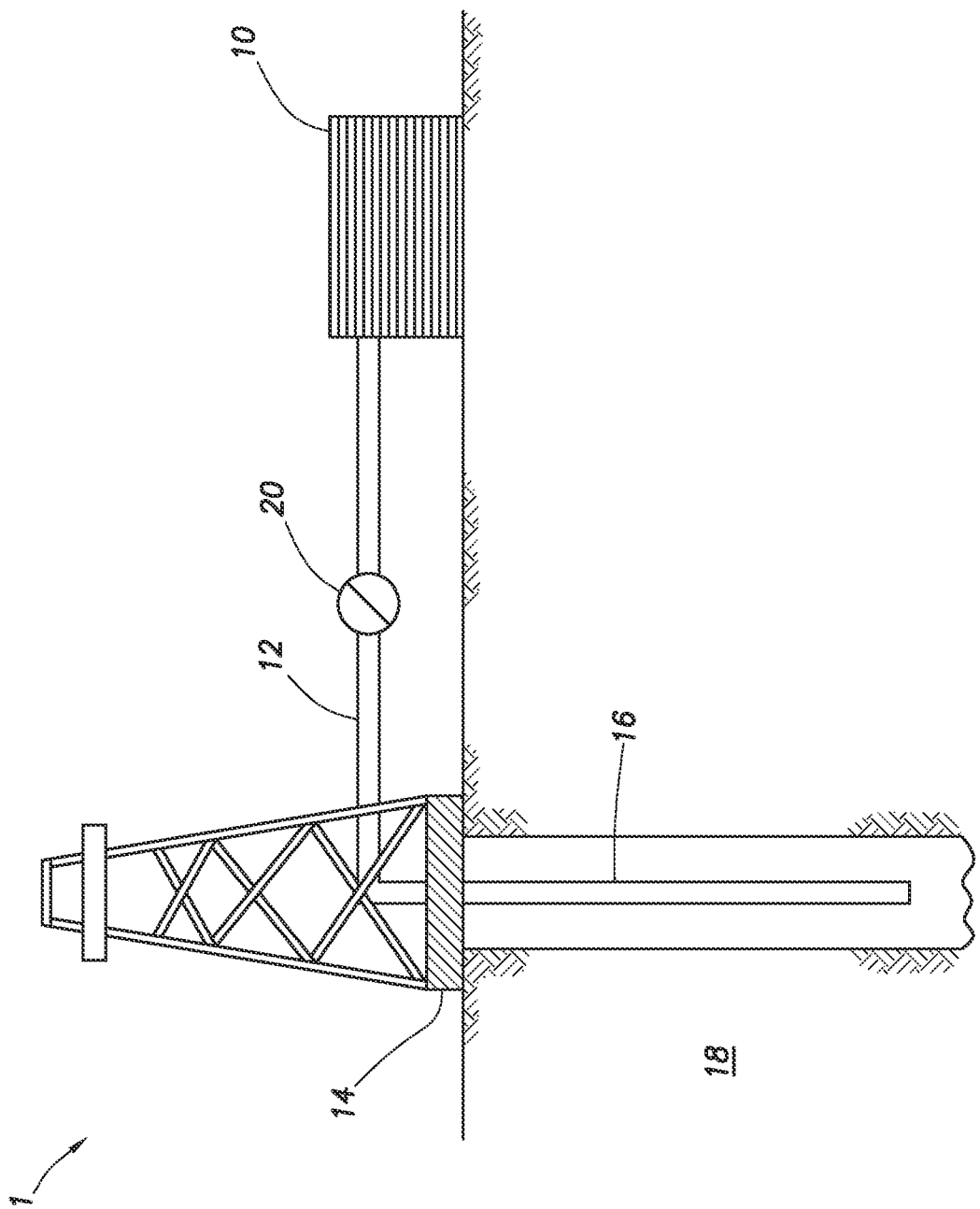

METHODS FOR ENHANCING SUSPENSION AND TRANSPORT OF PROPPANT PARTICULATES AND SUBTERRANEAN FORMATION CONDUCTIVITY

BACKGROUND

The embodiments herein relate to subterranean formation operations, and more particularly to methods for enhancing both suspension and transport of proppant particulates and subterranean formation fracture conductivity.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The general term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure (e.g., flow rate) necessary to create or enhance at least one fracture in a subterranean formation.

Typically, particulate solids are suspended in a portion of one or more treatment fluids and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

During hydraulic fracturing or other subterranean formation operations, particulates or particles other than proppant may be suspended within the treatment fluid (e.g., weighting agents, bridging materials, and the like). These particulates and/or particles are included in the treatment fluid to ensure that the treatment fluid is adequate to perform its given function and may vary depending on, for example, the conditions of the subterranean formation.

The specific gravity of particulates and/or particles used in a subterranean operation may be high in relation to the treatment fluids in which they are suspended for transport and/or deposit into a fracture. As such, the particulates and/or particles may settle out of the treatment fluids at any point during the operation. For example, the particulates and/or particles may settle to the bottom of a wellbore or may form a heterogeneous gradient throughout the treatment fluids. Additionally, the particulates and/or particles may settle out of the treatment fluid prior to reaching their intended target zone, thereby reducing their effectiveness in the target zone. For instance, proppant particulates may settle out of a treatment fluid toward the bottommost portion of the fracture, resulting in complete or partial occlusion of the portion of the fracture where no proppant particulates have collected when the hydraulic pressure is removed (e.g., at the top of the fracture or a bottom portion of the fracture above a bottommost portion). As such, the productivity of a subterranean formation may be impaired due to such settling.

BRIEF DESCRIPTION OF THE DRAWINGS

The following figures are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the various treatment fluids described herein into a subterranean formation, according to one or more embodiments of the present disclosure.

DETAILED DESCRIPTION

The embodiments herein relate to subterranean formation operations, and more particularly to methods for enhancing both suspension and transport of proppant particulates and subterranean formation fracture conductivity.

Macro-sized fibers in combination with gelling agents have been previously used as suspension aids to reduce the settling of such particulates and/or particles during subterranean formation operations. Degradable macro-sized fibers have also been employed to improve the conductivity of propped fractures, where the macro-sized fibers degrade over time. The use of such fibers provides a mechanical means for bridging proppant particulates to aid in their vertical distribution within a propped fracture, as the strands can form networks that occupy space, mitigating the proppant particulates (or aggregates) from merging into one another so that proppant-free channels can be formed, particularly if the fibers are degradable and have degraded. The present disclosure provides an alternative to such fiber systems.

Specifically, the embodiments herein use various treatment fluids comprising combinations of nano-particles, non-degradable proppant particulates (or simply "proppant particulates"), and degradable particulates, where the nano-particles function to enhance suspension and reduce settling of the proppant particulates and/or degradable particulates. The term "treatment fluid" refers to any fluid that may be used in a subterranean application in conjunction with a desired function and/or for a desired purpose. The term "treatment fluid" does not imply any particular action by the fluid or any component thereof. In some embodiments, the proppant particulates alone or in combination with the degradable particulates further agglomerate to form proppant aggregates, which are masses of particulates that do not generally become dispersed without the application of shear. The nano-particles are similarly capable of enhancing the suspension and reducing the settling of the proppant aggregates. As used herein, the term "particulates," and grammatical variants thereof, refers to both the proppant particulates and the degradable particulates of the present disclosure, unless otherwise specified; the term "proppant aggregates," and grammatical variants thereof, refers to an aggregate or mass of either or both of the proppant particulates and/or degradable particulates of the present disclosure that do not generally become dispersed without the application of shear, unless otherwise specified. The term "particles," refers to any solid substance that is neither a proppant particulate nor a degradable particulate, as described herein.

The degradable particulates included in the treatment fluids alone or in aggregate form function with the proppant particulates to form a proppant pack within fractures in a subterranean formation. The nano-particles aid in keeping the aggregates and particulates in suspension until they reach a desired location within the subterranean formation, such as a fracture. Once a fracturing operation is complete, the hydraulic pressure is removed, fracture is allowed to close, and the degradable particulates are allowed to degrade to form at least one conductive channel between adjacent non-degradable proppant particulates and/or aggregates. As used herein, the term "channel" refers to a passage or tunnel in an accumulation (e.g., solid or non-solid) of particulates and/or particles through which a fluid (i.e., a liquid and/or gas) may flow, which includes larger "voids" (e.g., between adjacent proppant aggregates).

The embodiments of the present disclosure provide a number of advantages including the use of nano-particles to ensure suspension and transport of particulates and/or proppant aggregates to enhance their vertical distribution and longitudinal coverage within propped fractures, and the use of degradable particulates to generate conductive channels within proppant packs or between proppant aggregates. Thus, according to the embodiments herein, the nano-particles and the degradable particulates synergistically operate to greatly enhance the conductivity of a subterranean formation to produce fluids through propped fractures.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of each numerical value. For example, if the numerical value is "about 80%," then it can be 80%+/−5%, equivalent to 75% to 85%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly, that is the term can encompass 100% but need not. When used to refer to a state or component that can be expressed in numerical terms, the term "substantially" should be read to be 90% or more.

In some embodiments, the present disclosure provides a method of introducing a first particulate-free treatment fluid into a subterranean formation at an injection rate to generate pressure above the fracture gradient, thereby creating at least one fracture in the subterranean formation. As used herein, the term "fracture gradient" refers to the pressure required to induce fractures in a subterranean formation at a given depth. The term "particulate-free treatment fluid" or "PFTF" refers to a treatment fluid having no intentionally placed solid particulates therein, and having no more than about 5% of solids by weight of the treatment fluid prior to placement of the treatment fluid into a subterranean formation, such as due to processing operations (e.g., pumping equipment, mixing equipment, and the like). The first PFTF comprises an aqueous base fluid and a gelling agent.

Thereafter, a first particulate-laden treatment fluid is alternatingly introduced with a second particulate-laden treatment fluid into the subterranean formation having the at least one fracture therein. As used herein, the term "particulate-laden treatment fluid" or "PLTF" refers to a treatment fluid having intentionally placed solid particulates therein, and having at least about 6% of solids by weight of the treatment fluid prior to placement of the treatment fluid into a subterranean formation, including any due to processing operations (e.g., pumping equipment, mixing equipment, and the like). The first PLTF comprises an aqueous base fluid, a gelling agent, nano-particles, and degradable particulates. The nano-particles in the first PLTF, as described above, suspend and assist in transport of the degradable particulates. The second PLTF comprises an aqueous base fluid, a gelling agent, and proppant particulates. In some embodiments, the second PLTF may further comprise nano-particles, as described herein, without departing from the scope of the present disclosure. The alternating introduction of the first and second PLTFs causes the proppant particulates in the second PLTF to agglomerate into proppant aggregates by being surrounded by the first PLTF (e.g., by the degradable particulates and/or the base fluid therein). Similarly, because the first PLTF surrounds the second PLTF, the degradable particulates suspended in the first PLTF may additionally agglomerate and form aggregates.

The proppant aggregates formed in the second PLTF by being surrounded by the first PLTF are placed into the at least one fracture in the subterranean formation, where they are suspended therein. Thereafter, the hydraulic pressure is removed from the subterranean formation and the at least one fracture is closed, thereby putting mechanical closure pressure on the proppant aggregates. As used herein, the term "closure pressure" refers to the stress load at which a fracture closes in contact with proppant in place in the fracture. Thereafter, over time or by contact with a stimulus (e.g., temperature, a chemical stimulus, such as an acid, and the like), the degradable particulates are degraded, thereby forming at least one channel between adjacent proppant aggregates.

It should be noted that while the embodiments described herein are illustrated by describing the nano-particles of the present disclosure in a treatment fluid with degradable particulates, the nano-particles may equally be included in a treatment fluid with proppant particulates or a combination of degradable particulates and proppant particulates, without departing from the scope of the present disclosure. That is, the nano-particles may be included to provide suspension and transport of any of the particulates described in the present disclosure.

In some embodiments, the second PLTF, or any other PLTF comprising proppant aggregates, described herein further comprises a stabilizing agent to aid in agglomerating the proppant particulates together to form the proppant aggregates. That is, the stabilizing agent in the second PLTF is included therein in a form (e.g., liquid, solid, gelled, emulsion, and the like) that interacts with (e.g., coats, contacts, adheres to, and the like) the individual proppant particulates, which causes the individual proppant particulates to become "tacky" and adhere to one another for aid in forming the proppant aggregates. As used herein, the term "tacky" refers to a substance that is sticky to the touch. In some embodiments, the stabilizing agent may cure to further provide support, structure, and crush resistance to the proppant aggregates, which may additionally increase the shear required to disperse the proppant aggregates into individual proppant particulates. In other embodiments, the outer surface of the proppant particulates is coated with a stabilizing agent to achieve the same agglomeration results described in this paragraph. Coating of the proppant particulates may allow a lesser amount of stabilizing agent to be used. The term "coating," and grammatical variants thereof with reference to coating a particulate (e.g., an outer surface of a particulate) described herein does not imply complete coverage of the surface, but rather that at least about 50% (or at least about 60%, 70%, 80%, 90%, or 100%) of the surface thereof. In yet other embodiments, a stabilizing agent is both coated onto the outer surface of the proppant particulates and included in the PLTF, without departing from the scope of the present disclosure.

The aqueous base fluids for use in the various PFTF and PLTFs described herein (collectively referred to as "treatment fluids," unless otherwise specified) may be any aqueous fluid suitable for use in a subterranean formation operation. Aqueous base fluids suitable for use in the treatment fluids described herein may include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, aqueous-miscible fluids, and any combination thereof. Generally, the water may be from any source, provided that it does not contain components that might adversely affect the stability and/or performance of the treatment fluids.

Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

The treatment fluids described herein may be gelled by a gelling agent. A variety of gelling agents may be used, including hydratable polymers that contain one or more functional groups such as hydroxyl, carboxyl, sulfate, sulfonate, amino, or amide groups. Suitable gelling agents typically comprise polymers, synthetic polymers, and any combination thereof. A variety of gelling agents can be used in conjunction with the embodiments described herein and include, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain embodiments, the gelling agents may be polymers comprising polysaccharides, and derivatives thereof that contain one or more of these monosaccharide units including, but not limited to, galactose, mannose, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, carboxymethyl guar and cellulose derivatives, such as carboxymethyl cellulose, hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, polyvinylpyrrolidone, and any combination thereof. In other embodiments, the gelling agent molecule may be partially depolymerized. As used herein, the term "depolymerized," generally refers to a decrease in the molecular weight of the gelling agent molecule.

The amount of gelling agent included in the various treatment fluids of the present disclosure vary based on the treatment fluids function and the presence of other components, such as particulates.

The PFTF of the present disclosure are particulate-free, as described herein, and are used to create at least one fracture in a subterranean formation into which it is introduced. The PFTF is introduced above the fracture gradient of a formation to achieve the at least one fracture. The gelling agent included in the PFTF(s) of the present disclosure may be in the range of about 0.01% to about 2% by weight of the liquid portion of the treatment fluid, encompassing any value and subset therebetween. For example, the gelling agent included in the PFTF(s) may be about 0.01% to about 0.1%, or about 0.1% to about 0.4%, or about 0.4% to about 0.8%, or about 0.8% to about 1.2% to about 1.6%, or about 1.6% to about 2%, or about 0.4% to about 1.6%, or about 0.8% to about 1.2% by weight of the liquid portion of the treatment fluid, encompassing any value and subset therebetween. Each of these values is critical to the embodiments of the present disclosure and depend on a number of factors including, but not limited to, the desired viscosity of the PFTF, the type of gelling agent selected, the presence of one or more crosslinking agents, the type of subterranean formation, the presence of any additives, and the like, and any combination thereof.

The amount of gelling agent required to suspend and transport the degradable particulates in the first PLTF or any other PLTF treatment fluid comprising nano-particles is less than would be required without the presence of the nano-particles, as they assist in suspending and transporting particulates (e.g., the degradable particulates in the first PLTF and/or proppant particulates) regardless of the presence of any gelling agent (or crosslinking agent, described below). Accordingly, the treatment fluids comprising nano-particles may have an amount of gelling agent in the range of about 0.01% to about 2% by weight of the liquid portion of the treatment fluid, encompassing any value and subset therebetween. For example, the treatment fluids comprising nano-particles may have an amount of gelling agent of from about 0.01% to about 0.1%, or about 0.1% to about 0.4%, or about 0.4% to about 0.8%, or about 0.8% to about 1.2% to about 1.6%, or about 1.6% to about 2%, or about 0.4% to about 1.6%, or about 0.8% to about 1.2% by weight of the liquid portion of the treatment fluid, encompassing any value and subset therebetween. Each of these values is critical to the embodiments of the present disclosure and may depend on a number of factors including, but not limited to, the type of nano-particles included, the amount of nano-particles included, the type of particulates included (e.g., degradable particulates and/or proppant particulates), the amount of particulates included, the presence of any additives, and the like, and any combination thereof.

The amount of gelling agent in the PLTF treatment fluids described herein that do not comprise nano-particulates (e.g., the second PLTF) is selected to suspend and transport the particulates (e.g., proppant particulates and/or degradable particulates) included therein, with or without a crosslinking agent. In such embodiments, nano-particles are not in the PLTF and thus cannot contribute to the suspension and transport of particulates in the treatment fluid. In such cases, the treatment fluids comprising no nano-particles may have an amount of gelling agent in the range of about 0.01% to about 2% by weight of the liquid portion of the treatment fluid, encompassing any value and subset therebetween. For example, the treatment fluids comprising no nano-particles may have an amount of gelling agent of from about 0.01% to about 0.1%, or about 0.1% to about 0.4%, or about 0.4% to about 0.8%, or about 0.8% to about 1.2% to about 1.6%, or about 1.6% to about 2%, or about 0.4% to about 1.6%, or about 0.8% to about 1.2% by weight of the liquid portion of the treatment fluid, encompassing any value and subset therebetween. Each of these values is critical to the embodiments of the present disclosure and may depend on a number of factors including, but not limited to, the type of particulates included (e.g., proppant particulates and/or degradable particulates), the amount of particulates included, the presence of any additives, the location of the fracture in the formation, and the like, and any combination thereof.

Crosslinking agents may be used to crosslink gelling agent molecules to form crosslinked gelling agents. Crosslinking agents typically comprise at least one ion that is capable of crosslinking at least two gelling agent molecules. Examples of suitable crosslinking agents include, but are not limited to, disodium octaborate tetrahydrate, sodium diborate, pentaborates, ulexite and colemanite, compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate), compounds that can supply titanium IV ions (e.g., titanium lactate, titanium malate, titanium citrate, titanium ammonium lactate, titanium triethanolamine, and titanium acetylacetonate), aluminum compounds (e.g., aluminum lactate or aluminum citrate), antimony compounds, chromium compounds, iron compounds, copper compounds, zinc compounds, and any combination thereof. Suitable crosslinking agents generally are present in the treatment fluids described herein in an amount sufficient to provide, in situ, the desired degree of crosslinking between gelling agent molecules.

In certain embodiments, the crosslinking agents may be present in an amount of from about 0.1% to about 5% by weight of the gelling agents included in the treatment fluid, encompassing any value and subset therebetween. For example, the crosslinking agent may be about 0.1% to about 0.5%, or about 0.5% to about 1%, or about 1% to about 2%, or about 2% to about 3%, or about 3% to about 4%, or about 4% to about 5%, or about 0.5% to about 4.5%, or about 1% to about 4%, or about 1.5% to about 3.5%, or about 2% to about 3% by weight of the gelling agents included in the treatment fluid, encompassing any value and subset therebetween. Accordingly, the amount of crosslinking agent will vary with the type of treatment fluid into which it is included, as the amount of gelling agent varies with the type of treatment fluid into which it is included, as explained above, due to the various functions of a particular treatment fluid. Thus, each of the values of crosslinking agent is critical to the embodiments of the present disclosure and depends on a number of factors including, but not limited to, the type of treatment fluid into which it is included, the type of crosslinking agent(s) selected, the type of gelling agent(s) in the treatment fluid, the desired viscosity of the treatment fluid, and the like, and any combination thereof. In some embodiments, the gelling agent alone, or in combination with the nano-particles, is sufficient to provide desired viscosity and/or particulate transport and thus no crosslinking agent is included in the treatment fluid, without departing from the scope of the present disclosure.

The nano-particles of the present disclosure are nano-sized and able to suspend and transport particulates in a treatment fluid. The unit mesh size of the nano-sized particulates may be from about 1 nanometer (nm) to about 100 nm, encompassing any value and subset therebetween. For example, the nano-sized particulates may have a unit mesh size of from about 1 nm to about 20 nm, or about 20 nm to about 40 nm, or about 40 nm to about 60 nm, or about 60 nm to about 80 nm, or about 80 nm to about 100 nm, or about 10 nm to about 90 nm, or about 20 nm to about 80 nm, or about 30 nm to about 70 nm, or about 40 nm to about 60 nm, encompassing any value and subset therebetween. As used herein, the term "unit mesh size" refers to a size of an object (e.g., a nano-particle, a particulate, and the like) that is able to pass through a square area having each side thereof equal to a specified numerical value. Each of the aforementioned values is critical to the embodiments of the present disclosure and depend on a number of factors including, but not limited to, the type of nano-particle, the type of particulate(s) in the treatment fluid (e.g., degradable particulate), the amount of particulate(s) in the treatment fluid, the size of the particulate(s) in the treatment fluid, the amount of gelling agent(s), the presence and amount of crosslinking agent(s), and the like, and any combination thereof.

The nano-particles described herein may be made of any material capable of being included in the treatment fluids described herein and aiding in the suspension and transport of particulates regardless of the presence of a gelling agent (or crosslinking agent). The nano-particles are selected to interact together and with the surfaces of other particulates to overcome density effects otherwise leading to the sinking (or "sag") of such particulates in a treatment fluid. In some embodiments, the nano-particles described herein may be composed of a natural or synthetic clay material. Such clays may be selected from the kaolinite, montmorillonite-smectite, illite, and/or chlorite clay groups. An example of a suitable commercially available clay material, for example, is a LAPONITE® nano-particle. LAPONITE® is a synthetic clay, available from BYK Additives, Limited in Cheshire, United Kingdom (or other suitable supplier), that forms a thixotropic gel when dispersed in an aqueous base fluid.

In some embodiments, the clay nano-particles are preferably composed of a phyllosilicate clay (or "phyllosilicates"). Phyllosilicates are characterized by silicate tetrahedrons, in which a central silicon atom is surrounded by four oxygen atoms at the corners of the tetrahedron. The sheets are formed by the sharing of three of the oxygen atoms of each tetrahedron with other tetrahedrons without any two tetrahedrons having more than one oxygen atom in common (e.g., each tetrahedron is linked to three other, distinct tetrahedrons). The remaining unshared oxygen atom is capable of interaction or bonding with other atoms or molecules. Phyllosilicates may form a sheet structure comprising nanodisks, spheres, or rod-like components.

Suitable phyllosilicate clay for forming the nano-particles of the present disclosure include, but are not limited to, phyllosilicate smectite group clay, a phyllosilicate serpentine group clay, a phyllosilicatepyrophyllite-talc group clay, a phyllosilicate mica group clay, a phyllosilicate chlorite group clay, and any combinations thereof.

Suitable phyllosilicate smectite group clays for use in forming the nano-particles include, but are not limited to, an aliettite, a beidellite, a ferrosaponite, a hectorite, a nontronite, a pimelite, a saliotite, a saponite, a sauconite, a stevensite, a swinefordite, a volkonskoite, a yakhontovite, a zincsilite, and any combination thereof. Suitable phyllosilicate serpentine group clays include, but are not limited to, an amesite, an antigorite, a berthierine, a brindleyite, a caryopilite, a chrysotile, a clinochrysotile, a cronstedtite, a dickite, a fraipontite, a greenalite, a halloysite, a kaolinite, a kellyite, a lizardite, a manandonite, a nacrite, a nepouite, an odinite, an orthochrysotile, a parachrysotile, a pecoraite, and any combination thereof. Suitable phyllosilicate pyrophyllite-talc group clay include, but are not limited to, a ferripyropyllite, a minnesotaite, a pyrophyllite, a talc, a willemseite, and any combination thereof. Suitable phyllosilicate mica group clays include, but are not limited to, aluminoceladonite, an anadite, an aspidolite, a biotite, a bityite, a boromuscovite, a celadonite, a chernykhite, a chromceladonite, a clintonite, an ephesite, a ferro-aluminoceladonite, a ferroceladonite, a ferrokinoshitalite, a ganterite, a glauconite, a hendricksite, an illite, a kinoshitalite, a lepidolite, a luanshiweiite, a margarite, a masutomilite, a montdorite, a muscovite, a nanpingite, a norrishite, an oxykinoshitalite, an oxyphlogopite, a phengite, a phlogopite, a polylithionite, a preiswerkite, a roscoelite, a shirokshinite, a siderophyllite, a sokolovaite, a suhailite, a tainiolite, a tetraferriphlogopite, a tovelite, a trilithionite, a voloshinite, a yangzhumingite, a zinnwaldite, and any combination thereof. Suitable phyllosilicatechlorite group clays include, but are not limited to, a baileychlore, a borocookeite, a chamosite, a clinochlore, a cookeite, a corundophilite, a donbassite, a franklinfurnaceite, a nimite, an orthochamosite, a pennantite, a sudoite, and any combination thereof.

The shape of the nano-particles of the present disclosure may be any shape, provided that it meets the unit mesh sizes described above. For example, the nano-particles may be substantially spherical or polygonal in shape, without departing from the scope of the present disclosure. Moreover, the nano-particles may have the sheet structure described above with reference to the phyllosilicate clay material nano-particles. As used herein, the term "substantially spherical" refers to a material that has a morphology that includes spherical geometry and elliptic geometry, including oblong spheres, ovoids, ellipsoids, capsules, and the like and may have surface irregularities.

The nano-particles of the present disclosure may be included in the treatment fluids having particulates (e.g., degradable particulates and/or proppant particulates) in an amount of from about 0.1% to about 5% by weight of the liquid portion of the treatment fluid, encompassing any value and subset therebetween. For example, the nano-particles included in the treatment fluids having particulates may be about 0.1% to about 0.5%, or about 0.5% to about 1%, or about 1% to about 2%, or about 2% to about 3%, or about 3% to about 4%, or about 4% to about 5%, or about 0.5% to about 4.5%, or about 1% to about 4%, or about 1.5% to about 3.5%, or about 2% to about 3% by weight of the liquid portion of the treatment fluid, encompassing any value and subset therebetween. Each of these values is critical to the embodiments of the present disclosure and depend on a number of factors including, but not limited to, the type of particulates included, the amount of particulates included, the density of the particulates, the density of the aqueous base fluid, the type of nano-particulates included, and the like, and any combination thereof.

The material for forming the proppant particulates of the present disclosure (collectively referred to herein simply as "proppant particulates") may be any material, naturally-occurring or man-made, suitable for use in a subterranean formation and appropriate for use in the embodiments as described herein. Suitable materials for forming the proppant particulates include, but are not limited to, sand (e.g., desert sand, beach sand), cementitious material (e.g., Portland cement, Portland cement blends (e.g., blast-furnace slag), and non-Portland cement (e.g., super-sulfated cement, calcium aluminate cement, high magnesium-content cement, and the like), and the like), bauxite, alumino-silicate material, ceramic material (e.g., ceramic microspheres), glass material, polymeric material (e.g., ethylene-vinyl acetate or composite materials), metal (e.g., alkali metals, alkaline earth metals, transition metals, post-transition metals, metalloids), zeolites, polytetrafluoroethylene material, thermoplastic material (e.g., nylon thermoplastic) nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and any combination thereof.

The proppant particulates for use in the PLTF(s) of the present disclosure have a unit mesh size in the range of from about 75 micrometers (μm) to about 2000 μm, encompassing any value and subset therebetween. For example, the proppant particulates may be from about 75 μm to about 400 μm, or about 400 μm to about 800 μm, or about 800 μm to about 1200 μm, or about 1200 μm to about 1600 μm, or about 1600 μm to about 2000 μm, or about 200 μm to about 1800 μm, or about 400 μm to about 1600 μm, or about 600 μm to about 1400 μm, or about 800 μm to about 1200 μm, encompassing any value and subset therebetween. Each of these values is critical to the embodiments of the present disclosure and depend on a number of factors including, but not limited to, the type of subterranean formation, the size of the fracture into which the proppant particulates are placed, and the like, and any combination thereof. Similar to the nano-particulates, the shape of the proppant particulates may be such that they are substantially spherical or polygonal, provided that they are the unit mesh size described herein.

The degradable particulates of the present disclosure are selected to degrade over time in a subterranean formation, or to degrade upon contact with a stimulus that triggers degradation. As used herein, the term "degrade," and grammatical variants thereof, refers to the dissolution or chemical conversion of materials into smaller components, intermediates, or end products by at least one of solubilization, hydrolytic degradation, biologically formed entities (e.g., bacteria or enzymes), chemical reactions, electrochemical processes, thermal reactions, or reactions induced by radiation. The material comprising the degradable particulates described herein may be any degradable material suitable for use in a subterranean formation and appropriate for use in the embodiments of the present disclosure. Examples of suitable degradable particulates include, but are not limited to, a polysaccharide, chitin, chitosan, a protein, an aliphatic polyesters, a poly(lactide), a poly(glycolide), a poly(ε-caprolactone), a poly(hydroxybutyrate), a poly(anhydride), an aliphatic polycarbonate, an aromatic polycarbonate, a poly(orthoester), a poly(amino acid), a poly(ethylene oxide), a polyphosphazene, and any combination thereof.

In some embodiments, the degradable particulates are composed of water-soluble materials. Examples of suitable water-soluble materials for forming the degradable particulates of the present disclosure include, but are not limited to, ethyl cellulose, a cellulose derivative, an acrylic ester polymer, a methacrylic ester polymer, an acrylate polyvinyl ester polymer, a methacrylate polyvinyl ester polymer, an acrylate polyvinyl ester copolymer, a methacrylate polyvinyl ester copolymer, a starch derivative, a polyvinyl acetate polymer, a polyacrylic acid ester polymer, a butadiene styrene copolymer, a methacrylate ester copolymer, a cellulose acetate phthalate, a polyvinyl acetate phthalate, shellac, a methacrylic acid copolymer, a cellulose acetate trimellitate, a hydroxypropyl methylcellulose phthalate, zein, a starch acetate, a copolymer of methacrylic acid and methyl methacrylate, and any combination thereof. Examples of suitable commercially available water-soluble materials for forming the degradable particulates of the present disclosure include, but are not limited to, ETHOCEL™, ethyl cellulose polymers, available from Dow Chemical Company in Midland, Mich.; and EUDRAGIT®, copolymers of methacrylic acid and methyl methacrylate, available from Evonik Industries in Essen, Germany.

The degradable particulates of the present disclosure have a unit mesh size in the range of from about 5 micrometers (μm) to about 2000 μm, encompassing any value and subset therebetween. For example, the proppant particulates may be from about 5 μm to about 400 μm, or about 400 μm to about 800 μm, or about 800 μm to about 1200 μm, or about 1200 μm to about 1600 μm, or about 1600 μm to about 2000 μm, or about 200 μm to about 1800 μm, or about 400 μm to about 1600 μm, or about 600 μm to about 1400 μm, or about 800 μm to about 1200 μm, encompassing any value and subset therebetween. Each of these values is critical to the embodiments of the present disclosure and depends on a number of factors including, but not limited to, the type of subterranean formation, the size of the fracture into which the degradable particulates are placed, and the like, and any combination thereof. Similar to the nano-particulates, the shape of the proppant particulates may be such that they are substantially spherical or polygonal, provided that they are the unit mesh size described herein. Similar to the nano-particulates and proppant particulates, the shape of the degradable particulates may be such that they are substantially spherical or polygonal, provided that they are the unit mesh size described herein.

As used herein the term "food-grade" refers to materials described in 21 CFR §§ 170-199 (substances approved as food items, approved for contact for food, or approved for use as an additive to food) as of April 2015 and that are prepared from materials such as those described in 21 CFR §§ 170-199 as of April 2015.

In some embodiments, it may be preferred that the degradable particulates are composed of food-grade materials that do not pose environmental or operator handling concerns. The inventors have discovered that food-grade millet may be useful in a subterranean formation operation (e.g., a hydraulic fracturing operation) as degradable particulates. Examples of suitable food-grade millet for use in the embodiments of the present disclosure include, but are not limited to, finger millet, proso millet pearl millet, foxtail millet, sorghum millet, maize millet, polish millet, little millet, kodo millet, burgu millet, Japanese barnyard millet, indiant barnyard millet, browntop millet, job's tears millet, teff millet, white fonio millet, black fonio millet, raishan millet, guinea millet, and any combination thereof. The food-grade millet (or simply "millet") for use in forming the degradable particulates may be any size or shape described above. In some embodiments of the present invention, degradable particulates consist essentially of the food grade millet.

In some embodiments, at least a portion of the millet is in the form of whole grains, crushed grains, and/or powdered grains. As used herein, the term "at least a portion" means that about 1% or greater than the millet is in a particular form. The whole grain millet may have a unit mesh size in the range of about 500 μm to about 1500 μm, encompassing any value and subset therebetween. For example, the whole grain millet may have a unit mesh size of about 500 μm to about 700 μm, or about 700 μm to about 900 μm, or about 900 μm to about 1100 μm, or about 1100 μm to about 1300 μm, or about 1300 μm to about 1500 μm, or about 700 μm to about 1300 μm, or about 900 μm to about 1000 μm, encompassing any value and subset therebetween. The crushed grains of the millet may have a unit mesh size in the range of about 150 μm to about 500 μm, encompassing any value and subset therebetween, such as from about 150 μm to about 220 μm, or about 220 μm to about 290 μm, or about 290 μm to about 360 μm, or about 360 μm to about 430 μm, or about 430 μm to about 500 μm, or about 200 μm to about 450 μm, or about 250 μm to about 400 μm, or about 300 μm to about 350 μm, encompassing any value and subset therebetween. The powdered grain millet may have a unit mesh size of about 5 μm to about 150 μm, encompassing any value and subset therebetween, such as 5 μm to about 30 μm, or about 30 μm to about 60 μm, or about 60 μm to about 90 μm, or about 90 μm to about 120 μm, or about 120 μm to about 150 μm, or about 30 μm to about 120 μm, or about 60 μm to about 90 μm, encompassing any value and subset therebetween. Each of the foregoing values is critical to the embodiments of the present disclosure and depends on a number of factors including, but not limited to, the type of subterranean formation, the size of the fracture into which the degradable food-grade millet particulates are placed, and the like, and any combination thereof.

As previously described, the PLTF comprising the proppant particulates may further comprise a stabilizing agent and/or the stabilizing agent may be coated onto the outer surface of the proppant particulates to facilitate the formation of proppant aggregates. Examples of suitable stabilizing agents include, but are not limited to, a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a consolidation agent emulsion, and any combination thereof. Such combinations may include, for example, use of a non-curable consolidation agent (e.g., one that does not cure into a solid, hardened mass) and/or a curable consolidation agent.

The amount of stabilizing agent included in the treatment fluid or mixed with the proppant particulates to coat them is any amount suitable to facilitate formation of the proppant aggregates. In some embodiments, the stabilizing agent is present in an amount of about 0.1% to about 10% by weight of the proppant particulates, either alone or in a treatment fluid, encompassing any value and subset therebetween. For example, the stabilizing agent may be present of from about 0.1% to about 0.5%, or about 0.5% to about 1%, or about 1% to about 2%, or about 2% to about 4%, or about 4% to about 6%, or about 6% to about 8%, or about 8% to about 10%, or about 1% to about 9%, or about 2% to about 8%, or about 3% to about 7%, or about 4% to about 6% by weight of the proppant particulates, encompassing any value and subset therebetween. Each of these values is critical to the embodiments of the present disclosure and depend on a number of factors including, but not limited to, the desired degree of agglomeration, the type of stabilizing agent(s) selected, the type of proppant particulates selected, and the like, and any combination thereof.

In various embodiments, systems configured for delivering the treatment fluids described herein to a down hole location are described. In various embodiments, the systems can comprise a pump fluidly coupled to a tubular, the tubular containing the one or more of the various treatment fluids. Each of the treatment fluids is placed separately downhole, although at any one time more than one treatment fluid may be present in the tubular (e.g., the alternatingly introduced first PLTF and second PLTF, or the first PFTF and the first PLTF, or the first PFTF, the first PLTF, and the second PLTF).

The pump may be a high pressure pump in some embodiments. As used herein, the term "high pressure pump" will refer to a pump that is capable of delivering a fluid down hole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery down hole.

FIG. 1 shows an illustrative schematic of a system that can deliver treatment fluids of the embodiments disclosed herein to a down hole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various down hole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, down hole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, down hole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: introducing a first particulate-free treatment fluid (first PFTF) into a subterranean formation at an injection rate to generate pressure above the fracture gradient, thereby creating at least one fracture in the subterranean formation, wherein the first PFTF comprises a first aqueous base fluid and a first gelling agent; alternatingly introducing a first particulate-laden treatment fluid (first PLTF) and a second particulate-laden treatment fluid (second PLTF) into the subterranean formation, wherein the first PLTF comprises a second aqueous base fluid, a second gelling agent, nano-particles, and degradable particulates, wherein the second PLTF comprises a third aqueous base fluid, a third gelling agent, and proppant particulates, and wherein the alternating introduction of the first PLTF and the second PLTF causes the proppant particulates in the second PLTF to agglomerate into proppant aggregates by being surrounded by the first PLTF; placing the proppant aggregates into the at least one fracture, where the proppant aggregates are suspended therein; removing a hydraulic pressure from the subterranean formation, thereby causing the at least one fracture to close; and degrading the degradable particulates, thereby forming at least one channel between adjacent proppant aggregates.

Embodiment A may have one or more of the following additional elements in any combination:

Element A1: Wherein the nano-particles are composed of a clay material.

Element A2: Wherein the nano-particles have a unit mesh size of about 1 nanometer to about 100 nanometers.

Element A3: Wherein the proppant particulates have a unit mesh size of about 75 micrometers to about 2000 micrometers.

Element A4: Wherein the degradable particulates have a unit mesh size of about 5 micrometers to about 2000 micrometers.

Element A5: Wherein the degradable particulates consist essentially of food-grade millet.

Element A6: Wherein the degradable particulates are composed of a degradable polymer selected from the group consisting of a polysaccharide, chitin, chitosan, a protein, an aliphatic polyesters, a poly(lactide), a poly(glycolide), a poly(ε-caprolactone), a poly(hydroxybutyrate), a poly(anhydride), an aliphatic polycarbonate, an aromatic polycarbonate, a poly(orthoester), a poly(amino acid), a poly(ethylene oxide), a polyphosphazene, and any combination thereof.

Element A7: Wherein the degradable particulates are composed of a water-soluble material selected from the group consisting of ethyl cellulose, a cellulose derivative, an acrylic ester polymer, a methacrylic ester polymer, an acrylate polyvinyl ester polymer, a methacrylate polyvinyl ester polymer, an acrylate polyvinyl ester copolymer, a methacrylate polyvinyl ester copolymer, a starch derivative, a polyvinyl acetate polymer, a polyacrylic acid ester polymer, a butadiene styrene copolymer, a methacrylate ester copolymer, a cellulose acetate phthalate, a polyvinyl acetate phthalate, shellac, a methacrylic acid copolymer, a cellulose acetate trimellitate, a hydroxypropyl methylcellulose phthalate, zein, a starch acetate, a copolymer of methacrylic acid and methyl methacrylate, and any combination thereof.

Element A8: Wherein the PLTF comprises a stabilizing agent, the proppant particulates are coated with a stabilizing agent, or the PLTF comprises a stabilizing agent and the proppant particulates are coated with a stabilizing agent.

Element A9: Further comprising a tubular extending into the subterranean formation and a pump fluidly coupled to the tubular, wherein a fluid selected from the group consisting of the first PFTF, the first PLTF, the second PLTF, and any combination thereof is contained in the tubular.

By way of non-limiting example, exemplary combinations applicable to A include: A1-A9; A1, A4, and A8; A3 and A7; A2, A5, A6, and A9;

A2 and A4; A5, A7, and A9; A1, A5, A7, and A8; and the like.

Embodiment B: A method comprising: introducing a first particulate-free treatment fluid (first PFTF) into a subterranean formation at an injection rate to generate pressure above the fracture gradient, thereby creating at least one fracture in the subterranean formation, wherein the first proppant-free treatment fluid comprises a first aqueous base fluid and a first gelling agent; alternatingly introducing a first particulate-laden treatment fluid (first PLTF) and a second particulate-laden treatment fluid (second PLTF) into the subterranean formation, wherein the first PLTF comprises a second aqueous base fluid, a second gelling agent, nano-particles, and degradable particulates comprise food-grade millet, wherein the second PLTF comprises a third aqueous base fluid, a third gelling agent, and proppant particulates, and wherein the alternating introduction of the first PLTF and the second PLTF causes the proppant particulates in the second PLTF to agglomerate into proppant aggregates by being surrounded by the first PLTF; placing the proppant aggregates into the at least one fracture, where the proppant aggregates are suspended therein; removing a hydraulic pressure from the subterranean formation, thereby causing the at least one fracture to close; and degrading the degradable particulates, thereby forming at least one channel between adjacent proppant aggregates.

Embodiment B may have one or more of the following additional elements in any combination:

Element B1: Wherein the at least one open fracture is created or enhanced by a first introduction of the PFTF.

Element B2: Wherein the nano-particles are composed of a clay material.

Element B3: Wherein the nano-particles have a unit mesh size of about 1 nanometer to about 100 nanometers.

Element B4: Wherein the proppant particulates have a unit mesh size of about 75 micrometers to about 2000 micrometers.

Element B5: Wherein the food-grade millet is at least partially in the form of whole grains having a unit mesh size of about 500 micrometers to about 1500 micrometers.

Element B6: Wherein the food-grade millet is at least partially in the form of crushed grains having a unit mesh size of about 150 micrometers to about 500 micrometers.

Element B7: Wherein the food-grade millet is at least partially in the form of powdered grains having a unit mesh size of about 5 micrometers to about 150 micrometers.

Element B8: Wherein the food-grade millet is selected from the group consisting of finger millet, proso millet pearl millet, foxtail millet, sorghum millet, maize millet, polish millet, little millet, kodo millet, burgu millet, Japanese barnyard millet, indiant barnyard millet, browntop millet, job's tears millet, teff millet, white fonio millet, black fonio millet, raishan millet, guinea millet, and any combination thereof.

Element B9: Wherein the PLTF comprises a stabilizing agent, the proppant particulates are coated with a stabilizing agent, or the PLTF comprises a stabilizing agent and the proppant particulates are coated with a stabilizing agent.

Element B10: Further comprising a tubular extending into the subterranean formation and a pump fluidly coupled to the tubular, wherein a fluid selected from the group consisting of the first PFTF, the first PLTF, the second PLTF, and any combination thereof is contained in the tubular.

By way of non-limiting example, exemplary combinations applicable to B include: B1-B10; B1, B3, B6, and B9; B8 and B10; B2, B3, B7, and B10; B3 and B5; B6, and B8; B1, B2, B4, and B9; B6 and B7; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   introducing a first particulate-free treatment fluid (first PFTF) into a subterranean formation at an injection rate to generate pressure above the fracture gradient, thereby creating at least one fracture in the subterranean formation,
      wherein the first PFTF comprises a first aqueous base fluid and a first gelling agent;
   alternatingly introducing a first particulate-laden treatment fluid (first PLTF) and a second particulate-laden treatment fluid (second PLTF) into the subterranean formation,
      wherein the first PLTF comprises a second aqueous base fluid, a second gelling agent, nano-particles, and degradable particulates,
      wherein the second PLTF comprises a third aqueous base fluid, a third gelling agent, and proppant particulates, and
      wherein the alternating introduction of the first PLTF and the second PLTF causes the proppant particulates in the second PLTF to agglomerate into proppant aggregates by being surrounded by the first PLTF;
   placing the proppant aggregates into the at least one fracture, where the proppant aggregates are suspended therein;
   removing a hydraulic pressure from the subterranean formation, thereby causing the at least one fracture to close; and
   degrading the degradable particulates, thereby forming at least one channel between adjacent proppant aggregates.

2. The method of claim 1, wherein the nano-particles are composed of a clay material.

3. The method of claim 1, wherein the nano-particles have a unit mesh size of about 1 nanometer to about 100 nanometers.

4. The method of claim 1, wherein the proppant particulates have a unit mesh size of about 75 micrometers to about 2000 micrometers.

5. The method of claim 1, wherein the degradable particulates have a unit mesh size of about 5 micrometers to about 2000 micrometers.

6. The method of claim 1, wherein the degradable particulates consist essentially of food-grade millet.

7. The method of claim 1, wherein the degradable particulates are composed of a degradable polymer selected from the group consisting of a polysaccharide, chitin, chitosan, a protein, an aliphatic polyesters, a poly(lactide), a poly(glycolide), a poly($\varepsilon$-caprolactone), a poly(hydroxybutyrate), a poly(anhydride), an aliphatic polycarbonate, an aromatic polycarbonate, a poly(orthoester), a poly(amino acid), a poly(ethylene oxide), a polyphosphazene, and any combination thereof.

8. The method of claim 1, wherein the degradable particulates are composed of a water-soluble material selected from the group consisting of ethyl cellulose, a cellulose derivative, an acrylic ester polymer, a methacrylic ester polymer, an acrylate polyvinyl ester polymer, a methacrylate polyvinyl ester polymer, an acrylate polyvinyl ester copolymer, a methacrylate polyvinyl ester copolymer, a starch derivative, a polyvinyl acetate polymer, a polyacrylic acid ester polymer, a butadiene styrene copolymer, a methacrylate ester copolymer, a cellulose acetate phthalate, a polyvinyl acetate phthalate, shellac, a methacrylic acid copolymer, a cellulose acetate trimellitate, a hydroxypropyl methylcellulose phthalate, zein, a starch acetate, a copolymer of methacrylic acid and methyl methacrylate, and any combination thereof.

9. The method of claim 1, wherein the PLTF comprises a stabilizing agent, the proppant particulates are coated with a stabilizing agent, or the PLTF comprises a stabilizing agent and the proppant particulates are coated with a stabilizing agent.

10. The method of claim 1, further comprising a tubular extending into the subterranean formation and a pump fluidly coupled to the tubular, wherein a fluid selected from the group consisting of the first PFTF, the first PLTF, the second PLTF, and any combination thereof is contained in the tubular.

11. A method comprising:
   introducing a first particulate-free treatment fluid (first PFTF) into a subterranean formation at an injection rate to generate pressure above the fracture gradient, thereby creating at least one fracture in the subterranean formation,
      wherein the first proppant-free treatment fluid comprises a first aqueous base fluid and a first gelling agent;

alternatingly introducing a first particulate-laden treatment fluid (first PLTF) and a second particulate-laden treatment fluid (second PLTF) into the subterranean formation,
   wherein the first PLTF comprises a second aqueous base fluid, a second gelling agent, nano-particles, and degradable particulates comprise food-grade millet,
   wherein the second PLTF comprises a third aqueous base fluid, a third gelling agent, and proppant particulates, and
   wherein the alternating introduction of the first PLTF and the second PLTF causes the proppant particulates in the second PLTF to agglomerate into proppant aggregates by being surrounded by the first PLTF;
placing the proppant aggregates into the at least one fracture, where the proppant aggregates are suspended therein;
removing a hydraulic pressure from the subterranean formation, thereby causing the at least one fracture to close; and
degrading the degradable particulates, thereby forming at least one channel between adjacent proppant aggregates.

12. The method of claim 11, wherein the at least one open fracture is created or enhanced by a first introduction of the PFTF.

13. The method of claim 11, wherein the nano-particles are composed of a clay material.

14. The method of claim 11, wherein at least one of: the nano-particles have a unit mesh size of about 1 nanometer to about 100 nanometers, or the proppant particulates have a unit mesh size of about 75 micrometers to about 2000 micrometers.

15. The method of claim 11, wherein the food-grade millet is at least partially in the form of whole grains having a unit mesh size of about 500 micrometers to about 1500 micrometers.

16. The method of claim 11, wherein the food-grade millet is at least partially in the form of crushed grains having a unit mesh size of about 150 micrometers to about 500 micrometers.

17. The method of claim 11, wherein the food-grade millet is at least partially in the form of powdered grains having a unit mesh size of about 5 micrometers to about 150 micrometers.

18. The method of claim 11, wherein the food-grade millet is selected from the group consisting of finger millet, proso millet pearl millet, foxtail millet, sorghum millet, maize millet, polish millet, little millet, kodo millet, burgu millet, Japanese barnyard millet, indiant barnyard millet, browntop millet, job's tears millet, teff millet, white fonio millet, black fonio millet, raishan millet, guinea millet, and any combination thereof.

19. The method of claim 11, wherein the PLTF comprises a stabilizing agent, the proppant particulates are coated with a stabilizing agent, or the PLTF comprises a stabilizing agent and the proppant particulates are coated with a stabilizing agent.

20. The method of claim 11, further comprising a tubular extending into the subterranean formation and a pump fluidly coupled to the tubular, wherein a fluid selected from the group consisting of the first PFTF, the first PLTF, the second PLTF, and any combination thereof is contained in the tubular.

* * * * *